United States Patent [19]
Appleby

[11] 3,867,223
[45] Feb. 18, 1975

[54] METHOD FOR SHAPING PNEUMATIC TIRE

[75] Inventor: Paul E. Appleby, Cuyahoga Falls, Ohio

[73] Assignee: The Goodyear Tire & Rubber Company, Akron, Ohio

[22] Filed: June 28, 1972

[21] Appl. No.: 266,886

[52] U.S. Cl. ............ 156/123, 156/128 R, 156/128 I, 156/416
[51] Int. Cl. ............................................ B29h 17/26
[58] Field of Search .......... 156/414, 415, 416, 417, 156/401, 128 I, 127, 126, 132, 135

[56] References Cited
UNITED STATES PATENTS

| | | | |
|---|---|---|---|
| 1,389,442 | 8/1921 | Mattia | 156/416 |
| 2,084,009 | 6/1937 | Sohl | 156/416 |
| 2,814,330 | 11/1957 | Vanzo et al. | 156/416 |
| 2,986,196 | 5/1961 | Frazier | 156/416 |
| 3,018,213 | 1/1962 | Kraft | 156/416 |
| 3,035,629 | 5/1962 | Vanzo et al. | 156/416 |
| 3,047,450 | 7/1962 | Drakeford et al. | 156/416 |
| 3,386,875 | 6/1968 | Grote | 156/416 |

Primary Examiner—Clifton B. Cosby
Assistant Examiner—John E. Kittle
Attorney, Agent, or Firm—F. W. Brunner; M. L. Gill

[57] ABSTRACT

A generally cylindrical, inflatable, elastomeric membrane particularly adapted for use in conjunction with a tire building drum, said membrane having axially extending reinforcing cords extending from the axially opposite ends of the membrane and toward a circumferentially extending central portion but terminating short of the central portion.

8 Claims, 5 Drawing Figures

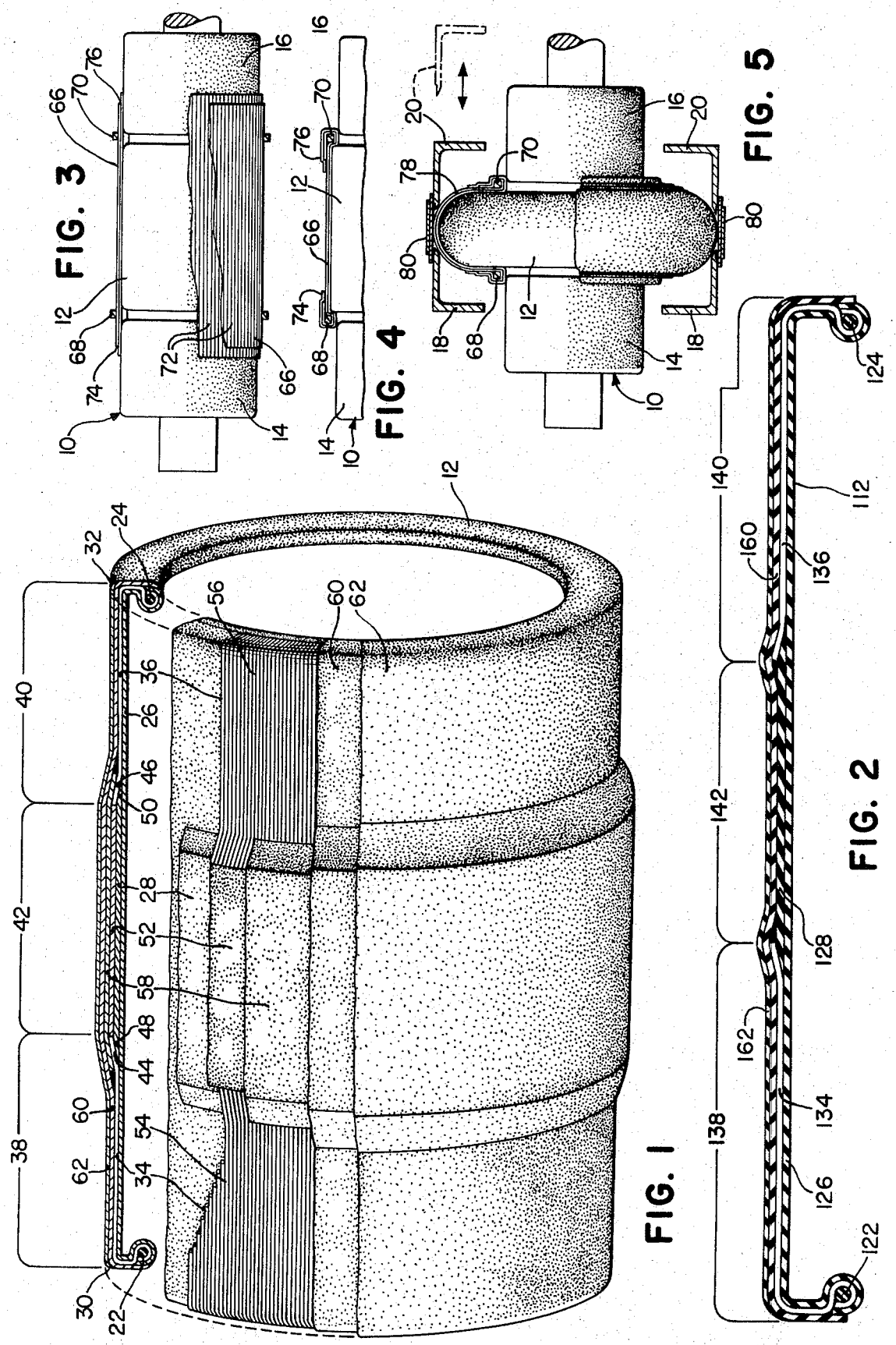

METHOD FOR SHAPING PNEUMATIC TIRE

BACKGROUND OF THE INVENTION

This invention relates to a method and device for manufacturing pneumatic tires and more particularly to an inflatable membrane on which the tire components are assembled and shaped which finds particular utility in the manufacture of radial ply tires.

Particularly with regard to radial ply tires, one most common method of manufacturing such tires includes asembling component parts of a tire in a cylindrical configuration. The partially assembled tire is then expanded to the general shape of a torus and a belt structure is then applied. It is desirable that these steps, as well as other steps in the manufacturing operation, be conducted in such a manner and on such equipment so as to provide a tire which is as uniform as possible.

SUMMARY OF THE INVENTION

The present invention relates to the steps in which a cylindrically shaped tire is inflated to the shape of a torus and more particularly to the shaping of a partially assembled tire to the shape of a torus for receiving a belt structure. Even further, it relates to a tire building drum provided with a unique bladder or membrane having different expansion characteristics in the central area of the membrane than it does in areas on the axially outer ends.

It has been discovered, quite surprisingly, that when a cylindrical membrane or inflatable bladder having axially extending cords on the end portions of the bladder but no reinforcement in the central portion of the bladder is utilized when shaping the tire to a torus the tires have a marked increase in uniformity over tires which are shaped on bladders having cords extending from end to end. This uniformity is exhibited by a substantial decrease in radial and lateral force variation as well as a substantial decrease in radial and lateral run-out.

It is therefore an object of this invention to provide a method and device for building and shaping pneumatic tires such that the finished tire will have improved uniformity. Other objects will be in part apparent and in part pointed out more in detail hereinafter.

In the drawing:

FIG. 1 is a perspective view of a membrane constructed in accordance with this invention with portions broken away;

FIG. 2 is a cross-sectional view of an alternate embodiment of a membrane constructed in accordance with this invention;

FIG. 3 is an elevational view of a tire building drum incorporating the membrane of FIG. 1, and illustrated in a radially collapsed axially expanded configuration;

FIG. 4 is an elevational view of the drum of FIG. 3 but illustrated expanded radially a slight amount and contracted axially a slight amount; and FIG. 5 is an elevational view of the drum of FIG. 3 but illustrated as axially collapsed and radially expanded to form a configuration of a torus.

With reference to the drawing and in particular FIG. 3 there is illustrated tire building drum 10 of the general type which includes a generally cylindrical inflatable membrane or bladder 12 located centrally of the drum and extending circumferentially thereabout and a pair of cylindrical turn-up bladders 14 and 16 disposed axially outwardly of the central bladder 12. Although, in the particular embodiment illustrated, the turn-up bladders 14 and 16 are physically separated from the central cylindrical bladder 12, it is contemplated these turn-up bladders 14 and 16 could be connected to the central bladder 12.

With reference to FIG. 5 the drum 10 is adapted to be collapsed axially between the axially outer extremities of the membrane 12 in conjunction with the inflation and expansion of the bladder 12 to a general configuration of a torus. In the particular embodiment illustrated a pair of end bells or cylindrical cans 18 and 20 are moved axially inwardly toward the central portion of the drum and surround a portion of the bladder 12 as it is expanded to the configuration of a torus.

With reference to FIG. 1 the bladder 12 is illustrated in perspective view with portions cut away and in its uninflated or relaxed generally cylindrical configuration. The bladder 12 includes a pair of enlarged bead portions 22 and 24 at its axially outer radially inner ends which are so shaped as to be readily fitted or clamped on the drum 10. A layer or liner of air impervious rubber 26 extends circumferentially about the inner surface of the membrane and axially from bead portion 22 to bead portion 24. A narrower layer of rubber 28 is disposed circumferentially about the liner 26 and located midway between the axially outer ends 30 and 32 of the membrane 12. A layer of fabric reinforcing material 34, 36 extends circumferentially about each portion of a pair of axially outer portions 38 and 40 of the membrane 12 and extends from respective bead portions 22, 24 axially inwardly toward a central portion 42 but terminates short of the central portion 42. The axially inner ends 44 and 46 of the reinforcing structures 34 and 36 overlap the axially outer ends 48 and 50 of the layer 28 for a short axial distance.

An additional central layer of rubber 52 is disposed between the axially inner ends 44 and 46 of the fabric reinforcing layers 34 and 36 and extends circumferentially about the tire. The fabric reinforcing layers 34 and 36 each include a layer of parallel cords 54 or 56 which extend substantially in axial directions.

A layer of rubber 58 is disposed circumferentially about the cushion layer 52 and overlaps the axially inner ends 44 and 46 of the reinforcing layers 34, 36. In the particular embodiment illustrated, an additional layer 60 of rubber surrounds the membrane and encloses the reinforcing layers 34 and 36, as well as the layer 58. Also in the particular embodiment illustrated, a layer 62 of elastomeric material having properties such that a tire built thereon would not adhere tightly thereto covers the entire radially outer surface of the membrane.

It can be seen that the central portion 42 of the membrane 12 is devoid of any fabric reinforcing structure and is thus elastically isotropic; that is, the elasticity of the structure in the central area 42 is the same in all directions tangent to the surface of the membrane. The axially outer portions 38 and 42 located on axially opposite sides of the central portion 42, however, are not elastically isotropic with respect to directions tangent to the surface of the membrane since the cords 54 and 56 extend in axial directions and afford greater resistance to stretch or expansion in axial directions, or in planes containing the longitudinal axis of the membrane, than it does in circumferential directions. Thus it can be seen that the central portion 42 has less resistance to expansion than the pair of portions 38 and 40 on axially opposite sides thereof.

In the manufacture of a radial ply tire in accordance with the method of this invention and utilizing the bladder 12, a pair of plies 66 of tire cord fabric are wrapped circumferentially about the drum 10, as illustrated in FIG. 3, with their axially outer ends extending over at least a portion of the turn-up bladders 14 and 16. A pair of annular bead rings 68 and 70 are disposed circumferentially about the pair of plies 66 and in close proximity to the axially outer ends thereof. The fabric plies 66 are arranged on the drum 10 such that the cords 72 extend substantially parallel to the rotational axis of the drum.

As seen in FIG. 4 the drum 10 is collapsed a slight amount in axial directions and expanded radially a slight amount and the axially outer ends 74 and 76 of the plies 66 are then folded axially inwardly and about the bead cores 68 and 70 in a manner well known in the art and utilizing the bladder turn-ups 14 and 16.

With reference to FIG. 5 the drum 10 is axially collapsed and radially expanded to shape the bladder 12 as well as the partially assembled pneumatic tire 78. The end bells or cans 18 and 20 also move axially inwardly and encircle a portion of the tire carcass 78 and provide a guide for applying a belt structure 80 to the shaped tire carcass 78. The end bells 18 and 20 are then retracted and tread rubber, as well as any other additional components are then added to the tire carcass. The drum 10 can then be radially collapsed and axially expanded to remove the tire 78 for further processing.

During the shaping of the tire from a cylindrical configuration to the general configuration of a torus illustrated in FIG. 5, since the bladder 12 is elastically isotropic in the central portion 42 and elastically non-isotropic in the side portions 38 and 40, the tire 12 on its internal surface is subjected to tangential surface forces that are isotropic in the central area adjacent the center portion 42 of the bladder 12 but subjected to non-isotropic tangential surface forces in the areas adjacent the axially outer portions 38 and 40 of the bladder 12. It can be seen further therefore that since the central portion 42 is unrestrained by any reinforcing members while the axially outer portions 38 and 40 are restrained by the axially extending cords that the axially outer portions of the tire 78 adjacent the portions 38 and 40 of the bladder 12 are restricted during expansion to a greater degree than is the central portion of the tire 78 adjacent the central portion 42 of the bladder 12. These additional restricting forces exerted tangentially against the surface of the tire 78 lie substantially along the radially extending cords 54, 56 and therefore lie substantially in planes containing the rotational axis of the membrane 12.

It will be appreciated that the particular laminated structure of the membrane may be altered, for example, as illustrated in FIG. 2. The membrane 112 illustrated in FIG. 2 has a pair of beads or end portions 122, and 124, as well as an air impervious inner liner 126 extending circumferentially about the inner surface of the membrane 112. A generally annular layer of rubber 128 is located centrally of the membrane and midway between the axially outer ends. A pair of fabric reinforcing layers 134 and 136 are located one each at the axially opposite ends of the membrane 112, and overlap the axially outer ends of the layer 128.

A layer of rubber 160 extends circumferentially about the fabric reinforcing layers 134 and 136, as well as the layer 128 and extends substantially from the bead portion 122 to the bead portion 124. An outer veneer or layer 162 of material which is suitable for releasing the tire may be provided circumferentially about the membrane 112. Again, there is a central portion 142, free of any cord reinforcement and a pair of axially outer portions 138 and 140 which have a fabric reinforcing layer.

While the present invention is particularly useful in the building of radial ply pneumatic tires, it is contemplated that such a bladder or drum equipped with such a bladder will also be useful in the manufacture of bias ply and bias belted tires. It is further contemplated that the membrane or bladder constructed in accordance with this invention could also be utilized as a shaping bladder in automatic tire shaping and curing presses.

While certain representative embodiments and details have been shown for the purpose of illustrating the invention, it will be apparent to those skilled in this art that various changes and modifications may be made therein without departing from the spirit or scope of the invention.

What is claimed is:

1. A method of manufacturing a pneumatic tire including shaping the unvulcanized tire from a generally cylindrical configuration to a general configuration of a torus, the improvement comprising; providing a membrane within the cavity of the tire, introducing fluid pressure into the cavity of the of the membrane to cause said tire to expand in radial directions while moving the axially outer ends axially toward each other, and, during the expansion of the tire, controlling the expansion of a pair of axially outer portions of said tire from the inside of the tire to a greater degree than the expansion of a central portion of said tire disposed between the axially outer portions.

2. The improvement as claimed in claim 1, wherein the control of the expansion of the pair of portions comprises providing additional resistance to expansion in directions lying in planes containing the rotational axis of the tire.

3. The improvement as claimed in claim 2, wherein said central portion to which a lesser degree of control of expansion is provided extends for at least 4 inches in axial directions and is located midway between the axially outer ends of the tire.

4. The improvement as claimed in claim 3, further including, prior to expansion of said tire, partially building said tire by forming a generally cylindrical reinforcing structure with cords extending generally parallel to the longitudinal axis of said cylindrical reinforcing structure and, subsequent to shaping said tire to a general configuration of a torus, applying a belt structure to said tire.

5. In a method of manufacturing a pneumatic tire including the steps of shaping an unvulcanized tire from the generally cylindrical configuration to a general configuration of a torus the improvement comprising; during the expansion of said tire, exerting first tangential forces which are isotropic to the inner surface of a central portion of the tire and applying second tangential forces which are non-isotropic to the inner surfaces of a pair of portions extending circumferentially about the tire and disposed on axially outer sides of said central portion.

6. The improvement as claimed in claim 5, wherein the isotropic tangential surface forces are applied to a band extending circumferentially about the tire disposed midway between the axially outer ends of the tire and extending in axial directions for at least 4 inches.

7. The improvement as claimed in claim 6, wherein the forces applied tangentially to the inner surfaces of the pair of portions are greatest in planes containing the rotational axis of the tire.

8. The improvement as claimed in claim 7, further including, prior to expansion of said tire, partially building said tire by forming a generally cylindrical carcass structure with cords extending generally parallel to the longitudinal axis of said cylindrical carcass structure and, subsequent to shaping said tire to a general configuration of a torus, applying a belt structure to said tire.

* * * * *